(12) United States Patent
Billings

(10) Patent No.: US 9,280,558 B1
(45) Date of Patent: Mar. 8, 2016

(54) REVISING A MAP AREA BASED ON USER FEEDBACK DATA

(75) Inventor: John Nicholas Billings, Berkeley, CA (US)

(73) Assignee: Yelp Inc., San Francisco, CA (US)

( * ) Notice: Subject to any disclaimer, the term of this patent is extended or adjusted under 35 U.S.C. 154(b) by 0 days.

(21) Appl. No.: 13/350,708

(22) Filed: Jan. 13, 2012

(51) Int. Cl.
*G06F 17/30* (2006.01)

(52) U.S. Cl.
CPC ............................. *G06F 17/30241* (2013.01)

(58) Field of Classification Search
CPC ....... G06F 17/30; G06F 2203/04; G06F 3/02; G06F 17/30241; G06F 17/3087; G06F 2203/04806; G06F 3/0236; G01C 21/32; G01C 21/367
USPC .................. 707/724, 743, 999.005, 751, 918; 701/455, 532; 340/995.1
See application file for complete search history.

(56) References Cited

U.S. PATENT DOCUMENTS

| | | | |
|---|---|---|---|
| 7,702,652 B2* | 4/2010 | Twig et al. | 707/770 |
| 8,711,181 B1* | 4/2014 | Nourse et al. | 345/660 |
| 2002/0112237 A1* | 8/2002 | Kelts | 725/39 |
| 2005/0027705 A1* | 2/2005 | Sadri et al. | 707/5 |
| 2006/0271281 A1* | 11/2006 | Ahn et al. | 701/208 |
| 2007/0115373 A1* | 5/2007 | Gallagher et al. | 348/231.3 |
| 2008/0086356 A1* | 4/2008 | Glassman et al. | 705/10 |
| 2009/0043907 A1* | 2/2009 | Peterson et al. | 709/231 |
| 2009/0204892 A1* | 8/2009 | Cheung et al. | 715/249 |
| 2009/0210388 A1* | 8/2009 | Elson et al. | 707/3 |
| 2011/0214050 A1* | 9/2011 | Stambaugh | 715/234 |
| 2011/0313649 A1* | 12/2011 | Bales et al. | 701/200 |
| 2012/0316782 A1* | 12/2012 | Sartipi et al. | 701/455 |

FOREIGN PATENT DOCUMENTS

WO    WO 2009080300 A2 *  7/2009  ............ G01C 21/32

* cited by examiner

*Primary Examiner* — Dennis Truong
(74) *Attorney, Agent, or Firm* — Van Pelt, Yi & James LLP

(57) ABSTRACT

Revising a map area based on user feedback data is disclosed. In some embodiments, an initial map area corresponding to a prescribed location identifier is obtained from a third-party mapping service, and a revised map area corresponding to the location identifier is determined based on the initial map area and user feedback data associated with the location identifier.

33 Claims, 5 Drawing Sheets

REVISING A MAP AREA BASED ON USER FEEDBACK DATA

BACKGROUND OF THE INVENTION

A map area associated with a particular location may be obtained from an existing geocoder service. However, such a map area obtained from a geocoder service may not encompass the area most likely to be of interest to a user.

BRIEF DESCRIPTION OF THE DRAWINGS

Various embodiments of the invention are disclosed in the following detailed description and the accompanying drawings.

DETAILED DESCRIPTION

Figure 1:
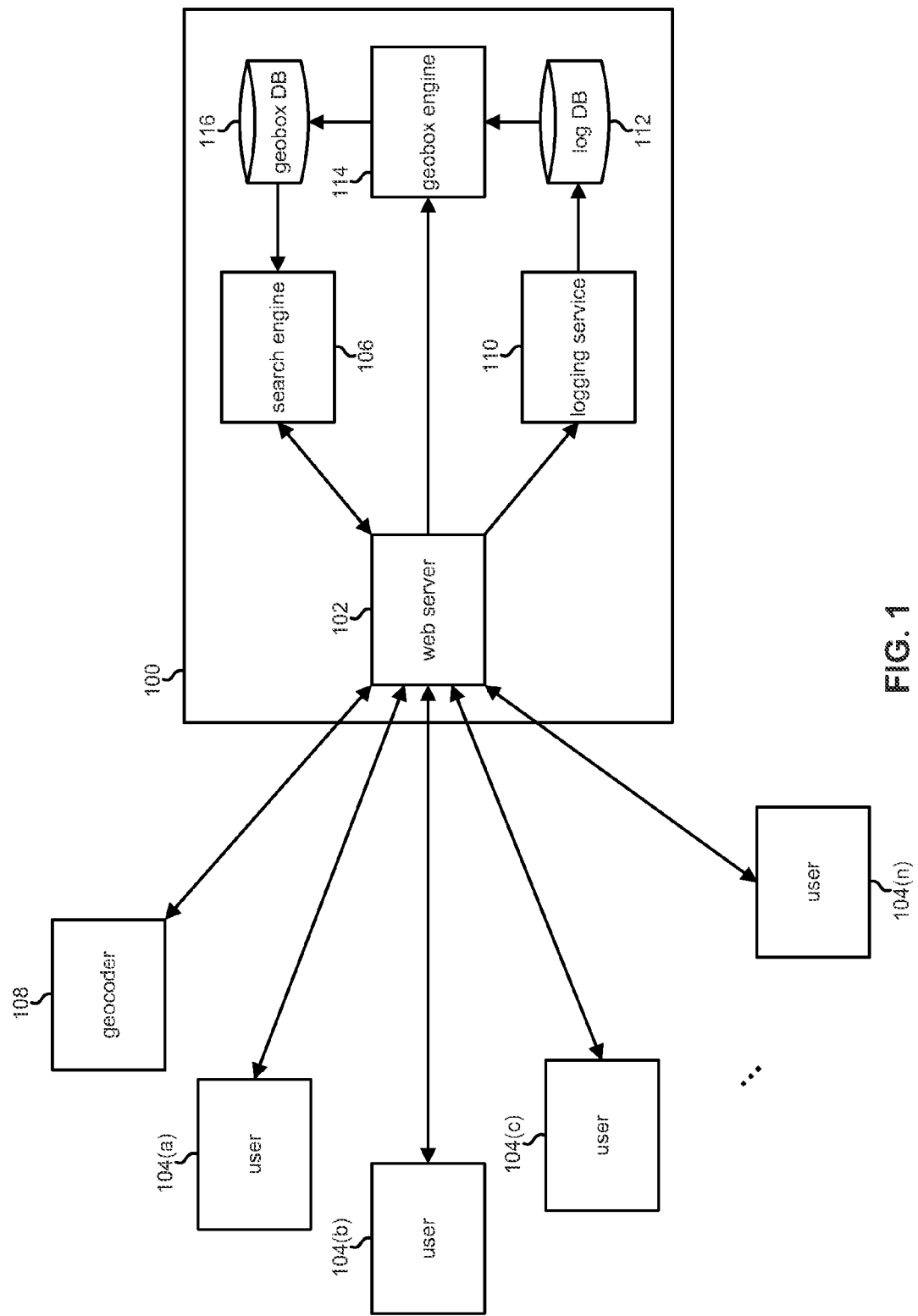
FIG. 1 is a high level block diagram illustrating an embodiment of major components of a system for revising a map area associated with a particular location.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Various web sites present users with maps of areas of interest. For example, a web site offering local search services may present to a user a map that encompasses a particular area of interest that is overlaid with business markers. In such cases, an area of interest is specified with respect to a user query by a location identifier. An initial map area that corresponds to a particular location identifier may be obtained from a third party mapping or geocoder service such as Google Maps or Bing Maps. However, such a map area obtained from a geocoder service that is based solely on a location identifier may not always adequately encompass a relevant area of interest. Revising a map area polygon based on historical user click data to better encompass an area more likely to be of interest for a corresponding location identifier is disclosed herein. In many of the given examples, a map area is described as a geobox, i.e., a geographical bounding box defined by maximum and minimum latitude and longitude coordinates. The described techniques, however, are not limited to geoboxes but may similarly be employed with respect to any map area polygon or geometry.

A map area obtained from a geocoder service for a particular location may be revised by adjusting its zoom level and/or center to reflect a more relevant area for the location based on historical user click data associated with the location and its surrounding areas. In some embodiments, such revised map areas associated with various locations are identified during an asynchronous, offline process, and associated map area specifications are stored in a database so that at runtime users can be presented with more relevant maps for locations of interest. In some such embodiments, if a revised map area specification for a particular location of interest has not been thus precomputed, a user is instead presented with a map area obtained from a geocoder service displaying the location of interest. In other embodiments, a revised map area may be dynamically generated at runtime in response to a user query.

FIG. 1 is a high level block diagram illustrating an embodiment of major components of a system for revising a map area associated with a particular location. The various blocks depicted in FIG. 1 may be configured to communicate via any one or more public and/or private networks, such as a LAN, a WAN, the Internet, etc. Although depicted as single blocks, the various blocks of FIG. 1 may comprise any number of possibly networked components. In some embodiments, system 100 is associated with a search service that presents a list and/or map of places (e.g., businesses) as search results in response to a user query for places in a location specified by a location identifier. Such a search service may provide further information associated with a place (e.g., a rating, reviews, detailed information such as an address, phone number, web site, hours, etc.) in a corresponding search results listing, in response to an indication of interest in (e.g., a mouse over of) a corresponding search result or marker on a search results map, and/or via a dedicated page associated with the place provided in response to a user selection of a corresponding search result or map marker.

A web server 102 of system 100 receives from a user 104 a query related to a specific location. The query comprises one or more location identifiers such as an address, neighborhood, city/state combination, postal or zip code, and/or other geographical division. The query may further comprise a type or category of place (e.g., restaurants, clubs, hotels, etc.), possibly specified with one or more further degrees of granularity (e.g., mediterranean restaurants, dance clubs, hotels with kitchen, etc.). Search engine 106 is configured to identify matches to the user query. Search engine 106 may comprise, for example, an Apache Lucene or other search engine platform. In addition to and/or instead of providing a listing of matching places as search results, system 100 is further configured to provide a search results map associated with the location specified in the query that includes markers or icons for at least high ranking matches. Such a search results map may be interactive. For example, a user may be able to manipulate the area displayed by the map, including by zooming and/or recentering the map to encompass a desired area. In such cases, map markers and/or an associated search results listing may be dynamically updated to reflect matches corresponding to a current area displayed by the map. Moreover, interaction with the markers on the map may provide further information. For example, an indication of interest in (e.g., a mouse over of) a marker may provide further information of the place indicated by the marker, and selecting or clicking on a marker may navigate a user to a specific page associated with the place indicated by the marker.

Initial map area data for various locations is obtained from geocoder 108. Geocoder 108, for example, may comprise the Google geocoder service, the Microsoft Bing geocoder service, or another third-party or affiliated geocoding service. In response to a provided location identifier, geocoder 108 returns a geobox comprising an area associated with the location identifier. For a particular location identifier, a geocoder service typically returns a geobox that is centered at or near the location identifier and that includes a prescribed radius or area around such a central point. Such a geobox returned by a geocoder for a given location identifier, however, may not encompass an area a user is most interested in considering or using as a search area.

In some embodiments, historical user click data is employed to identify more relevant map areas than those obtained from geocoder services. Logging service 110 of system 100 is configured to monitor and log user behavior with respect to provided search result listings and/or maps for various search locations. For example, user behaviors such as manipulations of search results maps, selections of various search results or markers on search results maps, refinements to search criteria to obtain desired results, etc., are tracked by logging service 110 and stored in log database 112 for various search locations. Log database 112, for example, may comprise Amazon's S3 storage service. User click data obtained from the behavior of many users 104 over time is indexed in database 112 by location identifiers so that historic user behaviors with respect to various locations can be collectively analyzed to profile and predict future user behaviors with respect to those locations. Data may be accumulated in database 112 for a particular location over any desired length of time and may be periodically purged and reaccumulated to reflect more current trends.

The historical user click data stored in database 112 is employed by geobox engine 114 to revise the default geobox returned by geocoder 108 for a particular location identifier to encompass an area that is more likely to be of interest to a user conducting a search using the location identifier as determined from the historic behavior of users who have searched using that or an equivalent location identifier. Geobox engine 114, for example, may comprise Amazon's Elastic MapReduce service. A specification of such a revised geobox determined by geobox engine 114 is indexed and stored in geobox database 116. Geobox database 116, for example, may comprise a MySQL database indexed by location identifiers. A geobox entry in geobox database 116, for example, may include a location identifier value, a zoom level value, and/or a center coordinate value. In some cases, a geobox entry in geobox database 116 includes values for minimum and maximum latitude and longitude coordinates. Geobox specifications stored in geobox database 116 are employed by system 100 to generate and provide to users more relevant search results maps in response to user queries for corresponding locations. The geobox data in geobox database 116 may be refreshed by geobox engine 114 as desired (e.g., every six months or year), for example, to take into consideration more recent user click data.

Figure 2:
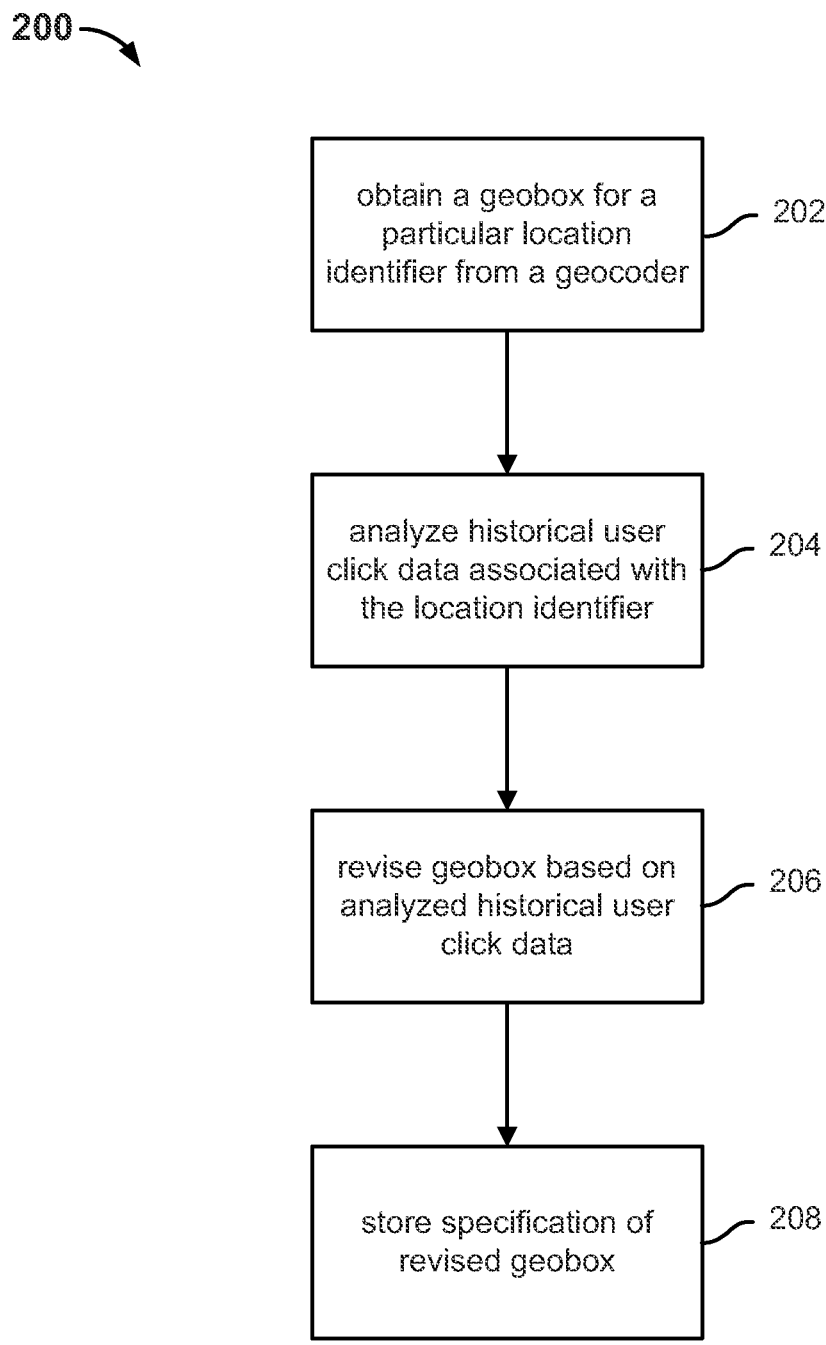
FIG. 2 is a flow chart illustrating an embodiment of a process for revising a geobox associated with a particular location identifier to encompass an area more likely to be of interest to a user.

FIG. 2 is a flow chart illustrating an embodiment of a process for revising a geobox associated with a particular location identifier to encompass an area more likely to be of interest to a user. In some embodiments, process 200 is employed by geobox engine 114 of FIG. 1 to generate a geobox specification stored in geobox database 116. Process 200 starts at step 202 at which a geobox corresponding to a particular location identifier is obtained from a geocoder such as geocoder 108 of FIG. 1. At step 204, historical user click data associated with the location identifier is analyzed. For example, the click behavior of users who searched using the location identifier or an equivalent location identifier is analyzed at step 204 to identify an area users are more likely interested in considering when searching using the location identifier. At step 206, the geobox obtained from the geocoder at step 202 is appropriately revised based on the historical user click data analyzed at step 204 to encompass an area more likely to be of interest to a user who searches using the location identifier. For example, the geobox may be zoomed out to include a larger geographical area, zoomed in to include a smaller geographical area, and/or repositioned to have a different center. A specification of the revised geobox determined at step 206 is stored at step 208 and used, for example, to present a more relevant search results map to a user in response to a query comprising the location identifier.

Figure 3:
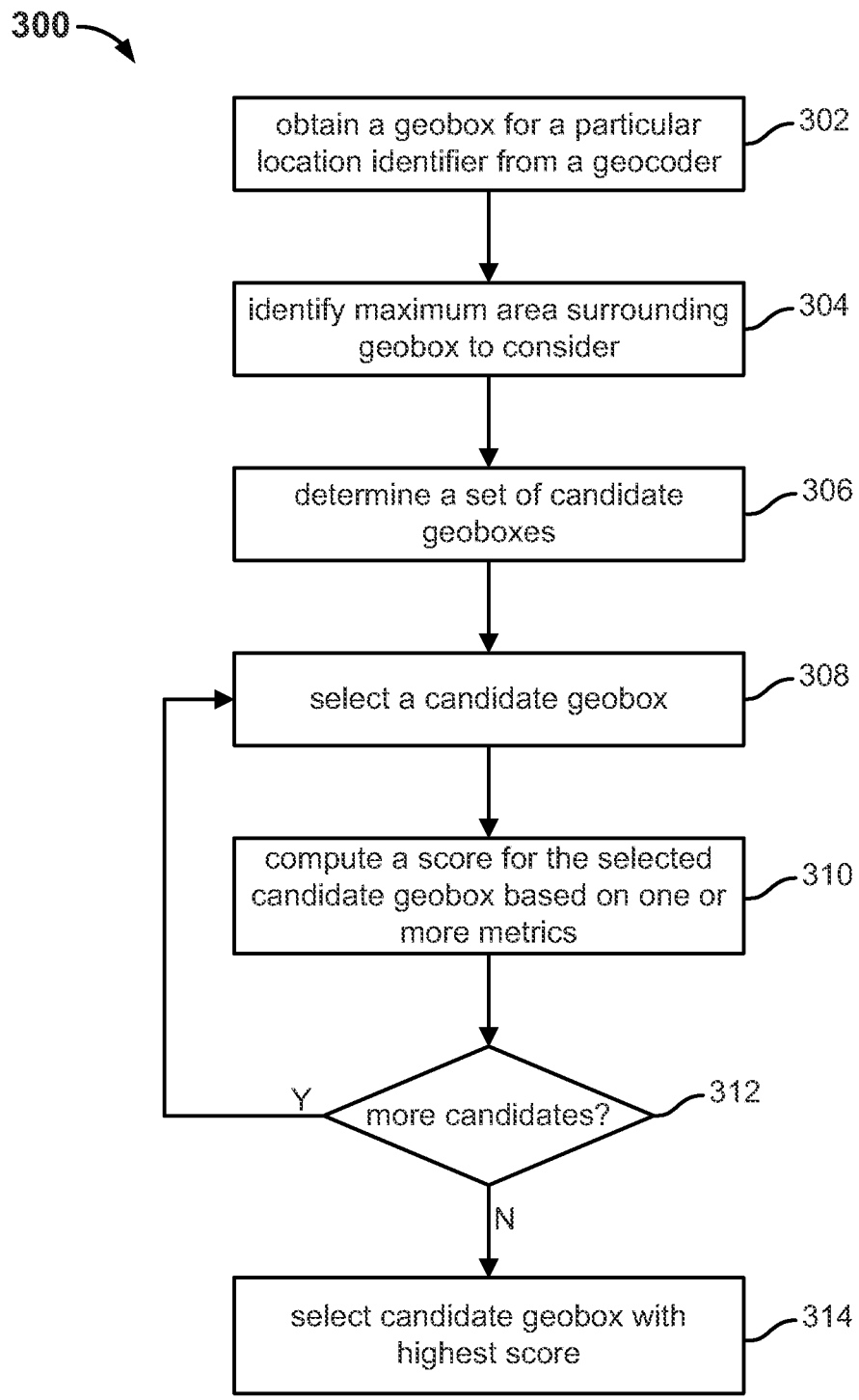
FIG. 3 is a flow chart illustrating an embodiment of a process for revising a geobox associated with a particular location identifier to encompass an area more likely to be of interest to a user.

FIG. 3 is a flow chart illustrating an embodiment of a process for revising a geobox associated with a particular location identifier to encompass an area more likely to be of interest to a user. In some embodiments, process 300 is employed by geobox engine 114 of FIG. 1. For example, process 300 may be employed at step 206 of process 200 of FIG. 2. Process 300 starts at step 302 at which a geobox corresponding to a particular location identifier is obtained from a geocoder such as geocoder 108 of FIG. 1. At step 304, a maximum area surrounding the area included in the geobox from the geocoder is identified so that this additional area can be taken into consideration when identifying a revised geobox for the location identifier. In some cases, a prescribed upper bound is set for the maximum area such as twice the area encompassed by the geobox obtained from the geocoder. In some cases, the area of the geobox obtained from the geocoder comprises the center of such a maximum area. At step 306, a set of candidate geoboxes having varying zoom levels and centers and not encompassing more than the maximum area identified at step 304 is determined. Such a set of candidate geoboxes may be employed to conduct a nearly exhaustive search for an optimal geobox for the given location identifier within the maximum area under consideration. In some cases, the set of candidate geoboxes is limited to prescribed zoom levels and centers so that such a search can be more efficiently performed. At step 308, a candidate geobox is selected from the set of candidate geoboxes determined at step 306. At step 310, a score is computed for the selected candidate geobox based on one or more metrics associated with the candidate geobox. Examples of such metrics and a scoring function are further described below. At step 312, it is determined whether scores for all candidate geoboxes included in the set of candidate geoboxes have been computed. If it is determined at step 312 that a score for at least one candidate geobox remains to be computed, process 300 continues at step 308 at which such a remaining candidate geobox is selected. If it is determined at step 312 that a score for each candidate geobox in the set of candidate geoboxes has been computed, the candidate geobox with the highest score is selected as the revised geobox for the location identifier at step 314. If multiple candidate geoboxes tie for the highest score, any one may be arbitrarily selected at step 314. Alternatively, one or more further metrics may be employed to resolve a tie condition.

A final score of a candidate geobox computed at step 310 may be based on any one or more appropriate metrics. The values or scores of such metrics may be normalized to a particular scale. For example, the scores associated with the metrics may be normalized to a scale of 0-1 inclusive. Examples of metrics that may be employed to score a candidate geobox are further described below.

Figure 4A:
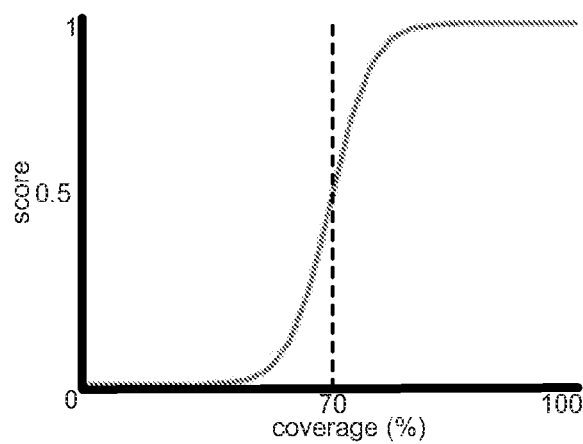
FIG. 4A illustrates an example of a function that may be employed to normalize a click coverage metric.

A click coverage metric may be employed to quantify the clicks received within an area encompassed by a candidate geobox. In some embodiments, a higher click coverage is considered better and thus scored higher because it indicates that many user clicks have been received in the area encompassed by the candidate geobox. Any appropriate function may be employed to normalize the click coverage metric. For example, a logistic function such as the example depicted in FIG. 4A may be employed in which a click coverage percentage of a candidate geobox dictates the value or score of the click coverage metric. A higher click coverage percentage results in a higher score. In this example, the inflection point of the logistic function occurs at 70% coverage, i.e., 70% coverage results in a click coverage score of 0.5.

Figure 4B:
FIG. 4B illustrates an example of a function that may be employed to normalize a zoom level metric.

A zoom level metric may be employed to represent the extent of geographical area encompassed by a candidate geobox. In some embodiments, a higher zoom level is considered better and scored higher since it encompasses a smaller geographical area and thus represents a more targeted area. In some cases, zoom levels are quantized and represented by a range of discrete values. For example, zoom levels may comprise values on a scale of 0-18, with 0 corresponding to the lowest zoom level and 18 corresponding to the highest zoom level. In some embodiments, the zoom level corresponding to the maximum area determined at step 304 of process 300 comprises the lowest possible zoom level for the set of candidate geoboxes of step 306 because it represents the maximum zoom out level. Any appropriate function may be employed to normalize the zoom level metric. For example, a linear function such as the example depicted in FIG. 4B may be employed. In this example, the zoom level of the maximum area (15 on a zoom scale of 0 to 18) is assigned a score of 0.8 and higher zoom levels are assigned linearly higher scores.

An intercentroid distance metric may be employed to represent the distance between the click centroid (i.e., the average location of user clicks received in the area encompassed by a candidate geobox) and the centroid of the candidate geobox. In some embodiments, a smaller intercentroid distance is considered better and thus scored more highly because this indicates that the average location of user clicks received in the area encompassed by a candidate geobox is at or near the center of the candidate geobox. A large intercentroid distance may be undesirable and thus scored lower because a user who is presented with a candidate geobox with a large intercentroid distance is more likely to click away from the center of the geobox. Any appropriate function may be employed to normalize the intercentroid distance metric.

Figure 4C:
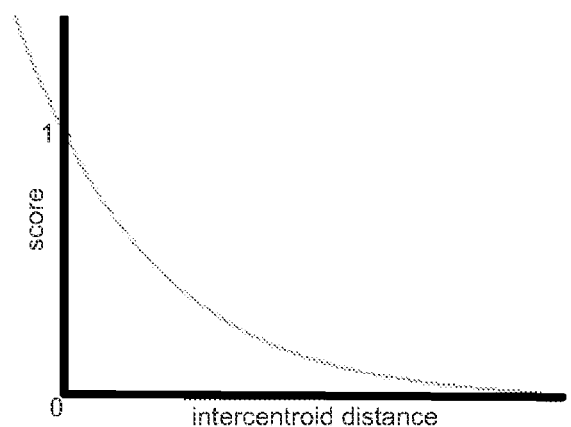
FIG. 4C illustrates an example of a function that may be employed to normalize an intercentroid distance metric.

For example, an exponential function such as the example depicted in FIG. 4C may be employed. As depicted, a smaller intercentroid distance results in a higher score, with the highest score of 1 resulting when the click centroid and candidate geobox centroid are co-located or superimposed, i.e., when the intercentroid distance is 0.

As described, the click coverage and intercentroid distance metrics take into consideration historical user click data associated with the area encompassed by a candidate geobox. A final score for a candidate geobox may be computed using a scoring function that is a function of the click coverage, zoom level, and/or intercentroid distance metrics. For example, the three metric scores may be multiplied together to generate a final score for a candidate geobox. In the cases in which the metric scores are normalized to a scale of 0-1, such a multiplicative scoring function is also normalized to the same scale. Although some metrics and a multiplicative scoring function have been described as examples, in other embodiments, a final score for a candidate geobox may be computed using any appropriate one or more metrics and any appropriate scoring function that combines the one or more metrics.

Figure 5A:
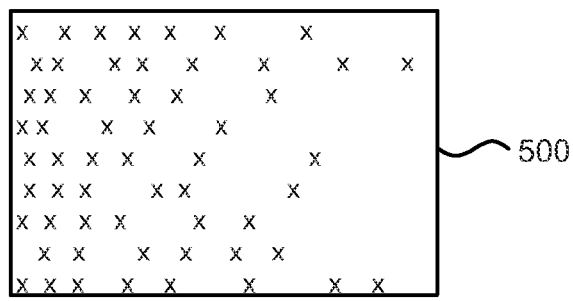
FIGS. 5A-5C illustrate an example of revising a geobox associated with a particular location identifier to encompass an area more likely to be of interest to a user.
Figure 5B:
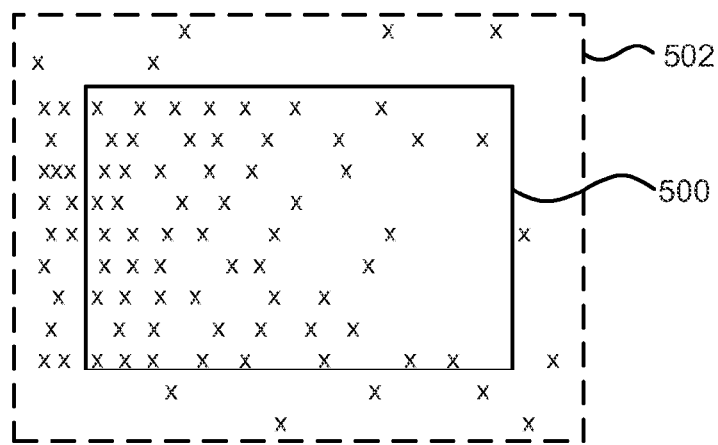
Figure 5C:
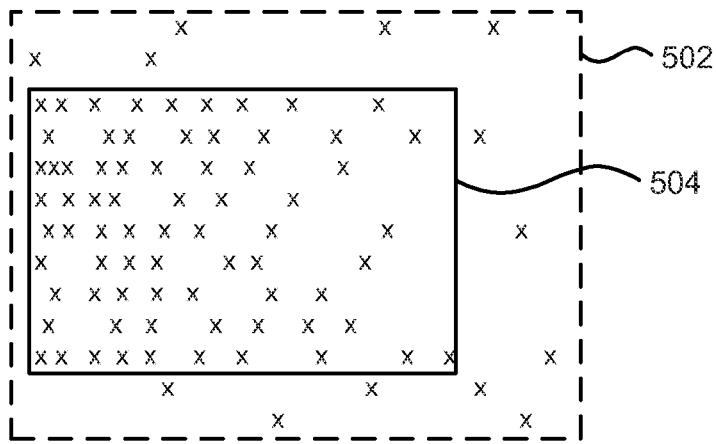

FIGS. 5A-5C illustrate an example of revising a geobox associated with a particular location identifier to encompass an area more likely to be of interest to a user. FIG. 5A shows the outline of a geobox 500 obtained from a geocoder service that corresponds to a particular location identifier and further shows user clicks (x) that have been received in the area encompassed by the geobox. FIG. 5B shows a maximum area 502 surrounding the area comprising geobox 500 that is taken into consideration when determining a revised geobox as well as user click data (x) in this maximum area. FIG. 5C shows a revised geobox 504 selected for the given location identifier. In this example, although geobox 500 and revised geobox 504 encompass the same area (i.e., have the same zoom level), revised geobox 504 has a higher click coverage. Thus, based on historical user click data associated with the area under consideration, the area encompassed by revised geobox 504 is expected to more likely be of interest to a user than that of geobox 500 that is obtained from a geocoder service.

As described, user feedback in the form of user click data may be employed to identify a better geobox for a particular location. In some embodiments, all available user click data associated with a particular location and/or its surrounding areas may be employed to determine a revised geobox. In some embodiments, a relevant subset of available click data may be employed to determine a revised geobox that is customized with respect to one or more parameters, such as types or categories of places, geographical divisions, particular users and/or demographics, etc. For example, only click data associated with restaurants may be employed to identify a geobox targeted to restaurants in a particular location, only click data associated with the area encompassed by a particular neighborhood may be employed to identify a geobox targeted to that neighborhood, only past click data of a particular user may be employed to identify a geobox targeted to that user's interests in a particular location, etc. Any one or more levels and/or granularities of filters may be applied to the available user click data to obtain a relevant subset of user click data that can be used to further personalize and/or customize a geobox with respect to one or more targeting parameters. In addition to and/or instead of user click data, other data associated with user feedback may be employed to target a geobox, such as rating data or review data. For example, business rating data may be employed to identify a geobox targeted to highly rated businesses in a particular location. In addition to and/or instead of data associated with user feedback, any other appropriate data may be employed to revise a geobox. For example, the actual locations of business in an area under consideration may be employed to identify a more relevant geobox for that area.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
obtaining an initial map area corresponding to a prescribed location identifier from a third-party mapping service, wherein the location identifier identifies a geographical region;
storing user feedback data from a plurality of different users received with respect to one or more past map areas presented for the location identifier, wherein the user feedback data comprises historical user click data including latitude and longitude coordinates of where the users click;
determining a revised map area corresponding to the location identifier based on the initial map area and user feedback data; and
providing the determined revised map area to subsequent users searching using the location identifier;
wherein the revised map area comprises a different map area than the initial map area and has a higher click coverage according to historical user click data and wherein all map areas comprise geographical map areas bound by latitude and longitude coordinates.

2. The method of claim 1, further comprising storing a specification of the revised map area.

3. The method of claim 2, further comprising generating a search results map using the specification of the revised map area.

4. The method of claim 3, further comprising providing the search results map to a user in response to a query from the user comprising the location identifier.

5. The method of claim 1, wherein the revised map area is determined by considering an area that is larger than an area encompassed by the initial map area.

6. The method of claim 1, wherein determining the revised map area comprises considering a set of candidate map areas, computing a score for each candidate map area that is a function of one or more metrics, and selecting a candidate map area with a highest score as the revised map area.

7. The method of claim 1, wherein the revised map area is determined based at least in part on a click coverage metric that represents clicks received within an area encompassed by the revised map area.

8. The method of claim 1, wherein the revised map area is determined based at least in part on a zoom level metric that represents an extent of geographical area covered by the revised map area.

9. The method of claim 1, wherein the revised map area is determined based at least in part on an intercentroid distance metric that represents a distance between an average location of clicks received in an area encompassed by the revised map area and a center of the revised map area.

10. The method of claim 1, wherein the user feedback data indicates past user behavior with respect to either or both a search results listing and a search results map provided in response to a query comprising the location identifier.

11. The method of claim 1, wherein the user feedback data satisfies a targeting condition.

12. A system, comprising:
a processor configured to:
obtain an initial map area corresponding to a prescribed location identifier from a third-party mapping service, wherein the location identifier identifies a geographical region;
store user feedback data from a plurality of different users received with respect to one or more past map areas presented for the location identifier, wherein the user feedback data comprises historical user click data including latitude and longitude coordinates of where the users click;
determine a revised map area corresponding to the location identifier based on the initial map area and user feedback data; and
provide the determined revised map area to subsequent users searching using the location identifier;
wherein the revised map area comprises a different map area than the initial map area and has a higher click coverage according to historical user click data and wherein all map areas comprise geographical map areas bound by latitude and longitude coordinates; and
a memory coupled to the processor and configured to provide instructions to the processor.

13. The system of claim 12, wherein the revised map area is determined by considering an area that is larger than an area encompassed by the initial map area.

14. The system of claim 12, wherein to determine the revised map area comprises considering a set of candidate map areas, computing a score for each candidate map area that is a function of one or more metrics, and selecting a candidate map area with a highest score as the revised map area.

15. The system of claim 12, wherein the revised map area is determined based at least in part on a click coverage metric that represents clicks received within an area encompassed by the revised map area.

16. The system of claim 12, wherein the revised map area is determined based at least in part on a zoom level metric that represents an extent of geographical area covered by the revised map area.

17. The system of claim 12, wherein the revised map area is determined based at least in part on an intercentroid distance metric that represents a distance between an average location of clicks received in an area encompassed by the revised map area and a center of the revised map area.

18. The system of claim 12, wherein the user feedback data indicates past user behavior with respect to either or both a search results listing and a search results map provided in response to a query comprising the location identifier.

19. The system of claim 12, wherein the user feedback data satisfies a targeting condition.

20. The system of claim 12, wherein the processor is further configured to store a specification of the revised map area.

21. A computer program product embodied in a non-transitory computer readable medium and comprising computer instructions for:
obtaining an initial map area corresponding to a prescribed location identifier from a third-party mapping service, wherein the location identifier identifies a geographical region;
storing user feedback data from a plurality of different users received with respect to one or more past map areas presented for the location identifier, wherein the user feedback data comprises historical user click data including latitude and longitude coordinates of where the users click;

determining a revised map area corresponding to the location identifier based on the initial map area and user feedback data; and providing the determined revised map area to subsequent users searching using the location identifier;

wherein the revised map area comprises a different map area than the initial map area and has a higher click coverage according to historical user click data and wherein all map areas comprise geographical map areas bound by latitude and longitude coordinates.

22. The computer program product of claim 21, wherein the revised map area is determined by considering an area that is larger than an area encompassed by the initial map area.

23. The computer program product of claim 21, wherein determining the revised map area comprises considering a set of candidate map areas, computing a score for each candidate map area that is a function of one or more metrics, and selecting a candidate map area with a highest score as the revised map area.

24. The computer program product of claim 21, wherein the revised map area is determined based at least in part on a click coverage metric that represents clicks received within an area encompassed by the revised map area.

25. The computer program product of claim 21, wherein the revised map area is determined based at least in part on a zoom level metric that represents an extent of geographical area covered by the revised map area.

26. The computer program product of claim 21, wherein the revised map area is determined based at least in part on an intercentroid distance metric that represents a distance between an average location of clicks received in an area encompassed by the revised map area and a center of the revised map area.

27. The computer program product of claim 21, wherein the user feedback data indicates past user behavior with respect to either or both a search results listing and a search results map provided in response to a query comprising the location identifier.

28. The computer program product of claim 21, wherein the user feedback data satisfies a targeting condition.

29. The system of claim 20, wherein the processor is further configured to generate a search results map using the specification of the revised map area.

30. The system of claim 29, wherein the processor is further configured to provide the search results map to a user in response to a query from the user comprising the location identifier.

31. The computer program product of claim 21, further comprising computer instructions for storing a specification of the revised map area.

32. The computer program product of claim 31, further comprising computer instructions for generating a search results map using the specification of the revised map area.

33. The computer program product of claim 32, further comprising computer instructions for providing the search results map to a user in response to a query from the user comprising the location identifier.

\* \* \* \* \*